United States Patent
Chatterji et al.

(10) Patent No.: US 7,093,658 B2
(45) Date of Patent: Aug. 22, 2006

(54) FOAMED TREATMENT FLUIDS, FOAMING ADDITIVES, AND ASSOCIATED METHODS

(75) Inventors: Jiten Chatterji, Duncan, OK (US); Philip D. Nguyen, Duncan, OK (US); Karen L. King, Duncan, OK (US); Stanley J. Heath, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 62 days.

(21) Appl. No.: 10/978,318

(22) Filed: Oct. 29, 2004

(65) Prior Publication Data

US 2006/0090895 A1   May 4, 2006

(51) Int. Cl.
*E21B 43/04* (2006.01)
*E21B 43/26* (2006.01)

(52) U.S. Cl. .................. 166/293; 166/309; 507/202; 507/269

(58) Field of Classification Search ............. 166/293, 166/309; 507/269, 202
See application file for complete search history.

(56) References Cited

U.S. PATENT DOCUMENTS

| | | | |
|---|---|---|---|
| 4,462,917 A | 7/1984 | Conway | |
| 4,502,967 A | 3/1985 | Conway | |
| 5,016,711 A * | 5/1991 | Cowan | 166/293 |
| 5,165,479 A | 11/1992 | Harris et al. | |
| 5,373,901 A | 12/1994 | Norman et al. | |
| 5,604,186 A | 2/1997 | Hunt et al. | |
| 5,833,000 A | 11/1998 | Weaver et al. | |
| 5,839,510 A | 11/1998 | Weaver et al. | |
| 5,853,048 A | 12/1998 | Weaver et al. | |
| 6,063,738 A * | 5/2000 | Chatterji et al. | 507/269 |
| 6,209,643 B1 | 4/2001 | Nguyen et al. | |
| 6,357,527 B1 | 3/2002 | Norman et al. | |
| 6,439,309 B1 | 8/2002 | Matherly et al. | |
| 6,454,004 B1 * | 9/2002 | Reddy et al. | 166/293 |
| 6,457,524 B1 * | 10/2002 | Roddy | 166/293 |
| 6,734,146 B1 | 5/2004 | Chatterji et al. | |

OTHER PUBLICATIONS

U.S. Appl. No. 10/864,061, filed Jun. 9, 2004, Blauch et al.
U.S. Appl. No. 10/864,618, filed Jun. 9, 2004, Blauch et al.

* cited by examiner

*Primary Examiner*—Frank Tsay
(74) *Attorney, Agent, or Firm*—Robert A. Kent; Baker Botts

(57) ABSTRACT

In one embodiment, this invention presents a foaming additive that comprises at least one amidopropyl betaine having the formula:

$$R\text{---}CONHCH_2CH_2CH_2N^+(CH_3)_2CH_2COO^-$$

wherein R is a capryloyl, a capryl, an octyl, a decyl, a cococyl radical, or a mixture thereof. This foaming additive may be utilized in foamed treatment fluids, and those foamed treatment fluids may be utilized in fracturing and sand control treatments in subterranean operations. Associated methods also are presented herein.

88 Claims, No Drawings

FOAMED TREATMENT FLUIDS, FOAMING ADDITIVES, AND ASSOCIATED METHODS

BACKGROUND

The present invention relates to methods and compositions for treating subterranean formations, and more specifically, to foamed treatment fluids, foaming additives, and associated methods.

Treatment fluids have been utilized in the treating of subterranean formations, e.g., for stimulation or sand control treatments such as fracturing or gravel packing, respectively. In fracturing treatments, a treatment fluid is pumped through a well bore into a subterranean formation at a rate and pressure such that one or more fractures are created or enhanced in a portion of the formation. The treatment fluid may comprise particulates, often referred to as "proppant particulates," that are deposited in the fractures. The proppant particulates function to prevent the fractures from fully closing upon the release of hydraulic pressure, forming conductive channels through which fluids may flow to the well bore. Treatment fluids used in fracturing treatments may comprise, in addition to water, a gelling agent to increase the viscosity of the fluid and stabilize the foamed fluid, enabling it to carry more and/or larger proppant. In order to reduce the subsequent flowback of proppant particulates and other particulates with the produced fluids, the last portion of the proppant particulates introduced into the fractures has heretofore been coated with an adhesive substance. As used herein, the term "adhesive substance" refers to a material that is capable of being coated onto a particulate and that exhibits a sticky or tacky character which, when applied to proppant that is slurried in a treatment fluid, causes the proppant particulates having adhesive substance thereon to have a tendency to create clusters or aggregates due to the effect of the closer pressure and temperature. As used herein, the term "tacky," in all its forms, generally refers to a substance having a nature such that it is (or may be activated to become) somewhat sticky to the touch. Typically, the proppant particulates coated with the adhesive substance may be deposited in the fracture after a large quantity of uncoated proppant particulates have been deposited therein.

Treatment fluids are also utilized in completion operations such as gravel packing. In gravel pack treatments, the treatment fluid suspends gravel particulates for delivery to a desired area in a well bore, e.g., near unconsolidated or weakly consolidated formation zones, to form a gravel pack to enhance sand control. One common type of gravel packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid is often reduced to allow it to be recovered. The gravel particulates may be coated with an adhesive substance, inter alia, to help prevent formation fines and sand from invading the gravel pack and thereby reducing the production potential of the well. In some situations, fracturing and gravel packing treatments are combined into a single treatment to provide stimulated production and an annular gravel pack to reduce formation sand production. Such treatments are often referred to as "frac pack" operations. In some cases, the treatments are completed with a gravel pack screen assembly in place, and the fracturing treatment being pumped through the annular space between the casing and screen. In such a situation, the fracturing treatment usually ends in a screen-out condition, creating an annular gravel pack between the screen and casing. This allows both the fracturing treatment and gravel pack to be placed in a single operation.

In carrying out subterranean treatment operations, the treatment fluids often may be foamed, wherein the treatment fluid further comprises a surfactant and a gas. In addition to being lightweight, foamed treatment fluids may effectively carry particulates (e.g., proppant particulates, gravel particulates, etc.) and also may require a smaller amount of gelling agent, reducing the amount of residue left in the subterranean formation by the gelling agent. Additionally, foamed treatment fluids have low fluid loss properties, reducing or removing the need for a fluid loss control additive. Foamed treatment fluids generally include one or more additives that facilitate the formation of and stabilize the foam, especially at higher temperatures where the foam tends to break down. However, many of these additives may react with and destroy the adhesive substance that may be coated on the particulates within the foamed treatment fluid, inhibiting particulate deposit and thus decreasing potential hydrocarbon production.

SUMMARY

The present invention relates to methods and compositions for treating subterranean formations, and more specifically, to foamed treatment fluids, foaming additives, and associated methods.

In one embodiment, the present invention provides a method of treating a subterranean formation, the method comprising: providing a foamed treatment fluid comprising water, a gas, and a foaming additive, the foaming additive comprising at least one amidopropyl betaine having the formula:

wherein R is a capryloyl, a capryl, an octyl, a decyl, a cococyl radical or a mixture thereof, and introducing the foamed treatment fluid into a well bore that penetrates the subterranean formation.

In another embodiment, the present invention provides a method of fracturing a portion of a subterranean formation, the method comprising: providing a foamed treatment fluid comprising water, a gas, and a foaming additive, the foaming additive comprising at least one amidopropyl betaine having the formula:

wherein R is a capryloyl, a capryl, an octyl, a decyl, a cococyl radical, or a mixture thereof, and introducing the foamed treatment fluid into a well bore that penetrates the subterranean formation at or above a pressure sufficient to create or enhance one or more fractures in a portion of the subterranean formation.

In another embodiment, the present invention provides a method of providing some degree of sand control in a subterranean formation, the method comprising: providing a foamed treatment fluid comprising water, a gas, particulates, and a foaming additive, the foaming additive comprising at least one amidopropyl betaine having the formula:

wherein R is a capryloyl, a capryl, an octyl, a decyl, a cococyl radical, or a mixture thereof, and introducing the foamed treatment fluid into a well bore that penetrates the subterranean formation such that the particulates form a gravel pack in or adjacent to the portion of the subterranean formation.

In another embodiment, the present invention provides a method of foaming a treatment fluid that comprises the step of adding to the treatment fluid a gas and a foaming additive, the foaming additive comprising at least one amidopropyl betaine having the formula:

wherein R is a capryloyl, a capryl, an octyl, a decyl, a cococyl radical, or a mixture thereof.

In another embodiment, the present invention provides a method of producing hydrocarbons from a subterranean formation, the method comprising: providing a foamed treatment fluid comprising water, a gas, and a foaming additive, the foaming additive comprising at least one amidopropyl betaine having the formula:

wherein R is a capryloyl, a capryl, an octyl, a decyl, a cococyl radical or a mixture thereof, introducing the foamed treatment fluid into a well bore that penetrates the subterranean formation, and producing hydrocarbons from the subterranean formation.

In another embodiment, the present invention provides a foamed treatment fluid that comprises comprises water, a gas, and a foaming additive, the foaming additive comprising at least one amidopropyl betaine having the formula:

wherein R is a capryloyl, a capryl, an octyl, a decyl, a cococyl radical, or a mixture thereof.

In yet another embodiment, the present invention provides a foaming additive that comprises at least one amidopropyl betaine having the formula:

wherein R is a capryloyl, a capryl, an octyl, a decyl, a cococyl radical, or a mixture thereof.

The features and advantages of the present invention will be readily apparent to those skilled in the art upon a reading of the description of the specific embodiments that follows.

DESCRIPTION

The present invention relates to methods and compositions for treating subterranean formations, and more specifically, to foamed treatment fluids, foaming additives, and associated methods.

The foamed treatment fluids of the present invention generally comprise water, a gas, and a foaming additive of the present invention. The foaming additive of the present invention comprises at least one amidopropyl betaine having the formula:

wherein R is a capryloyl, a capryl, an octyl, a decyl, a cococyl radical, or a mixture thereof. In certain embodiments, the foamed treatment fluids of the present invention may sustain a stable foam at a temperature up to about 325°

F. A variety of other additives suitable for the chosen treatment may be included in the foamed treatment fluids as desired.

The water utilized in the foamed treatment fluids of the present invention may include fresh water, saltwater (e.g., water containing one or more salts dissolved therein), brine (e.g., saturated saltwater), seawater, or combinations thereof. Generally, the water may be from any source provided that it does not adversely affect the stability of the foamed treatment fluid of the present invention. The density of the water can be increased to provide additional particle transport and suspension in the present invention.

The gas utilized in the foamed treatment fluids of the present invention may be any gas suitable for foaming a treatment fluid, including, but not limited to, nitrogen, carbon dioxide, air, derivatives thereof, and combinations thereof. Generally, the gas should be present in the foamed treatment fluids of the present invention in an amount sufficient to form a foam. In certain embodiments, the gas may be present in a foamed treatment fluid of the present invention in an amount in the range of from about 5% to about 95% by volume of the foamed treatment fluid exclusive of the volume of the gas.

The foaming additive of the present invention comprises at least one amidopropyl betaine having the formula:

wherein R is a capryloyl, a capryl, an octyl, a decyl, a cococyl radical, or a mixture thereof. Among other things, the foaming additive of the present invention should facilitate the foaming of a treatment fluid and also act to stabilize the foamed treatment fluid formed therewith. Further, it is believed that the foaming additive of the present invention does not undesirably interact with an adhesive substance that may be coated on the particulates that the foamed treatment fluid may contain. Moreover, this foaming additive is thought to be relatively environmentally benign, inter alia, because the additive is generally biodegradable in most environments and does not contain organic solvents. Generally, the foaming additive of the present invention may be present in a foamed treatment fluid in an amount suitable for foaming and stabilizing the foamed treatment fluid. In certain embodiments, the foaming additive may be present in a foamed treatment fluid of the present invention in an amount in the range of from about 0.01% to about 10% by volume of the water ("bvow").

The foamed treatment fluids of the present invention optionally may comprise a gelling agent to increase the viscosity of the fluid and stability of the foam. A variety of gelling agents may be used, including, e.g., natural polymers, synthetic polymers, biopolymers, or combinations thereof. In certain embodiments, the gelling agent may be a crosslinked gelling agent that is a reaction product of the gelling agent and a crosslinking agent. In certain embodiments, the gelling agents may be biopolymers comprising polysaccharides, and derivatives thereof, that contain one or more of these monosaccharide units: galactose, mannose, glucoside, glucose, xylose, arabinose, fructose, glucuronic acid, or pyranosyl sulfate. Examples of suitable polymers include, but are not limited to, xanthan gum; whelan gum; guar gum and derivatives thereof, such as hydroxypropyl guar, carboxymethylhydroxypropyl guar, and carboxymethyl guar; and cellulose derivatives, such as hydroxyethyl cellulose, carboxymethyl cellulose, and carboxymethylhydroxyethyl cellulose. In certain exemplary embodiments, the gelling agents may include galactomannan gum, glucomannan gum, or derivatives thereof. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. The gelling agent generally may be present in a foamed treatment fluid of the present invention in an amount in the range of from about 0.01% to about 3% bvow. In certain embodiments, the gelling agent may be present in a foamed treatment fluid of the present invention in an amount in the range of from about 1% to about 1.5% bvow.

To further increase the viscosity of the foamed treatment fluids, the foamed treatment fluids of the present invention comprising a gelling agent optionally may comprise a crosslinking agent to crosslink gelling agent molecules through a crosslinking reaction to form crosslinked gelling agents. Crosslinking agents typically comprise at least one metal ion that is capable of crosslinking polymer molecules. Examples of suitable crosslinking agents include, but are not limited to, borate compounds (such as, for example, alkali metal-alkaline earth borates, borate compounds mixed with amines and alkaline earth metal borates), zirconium compounds (such as, for example, zirconium lactate, zirconium lactate triethanolamine, zirconium carbonate, zirconium acetylacetonate, zirconium maleate, zirconium citrate, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or combinations thereof. Examples of suitable borate compounds include ulexite, colemanite, calcined colemanite, and other similar borates. An example of a suitable zirconium-based crosslinking agent is described in U.S. Pat. No. 5,165,479, the relevant disclosure of which is herein incorporated by reference. An example of a suitable commercially available zirconium-based crosslinking agent is "CL-24™," available from Halliburton Energy Services, Inc., Duncan, Okla. Examples of suitable titanium-based crosslinking agents are described in U.S. Pat. Nos. 4,462,917 and 4,502,967, the relevant disclosures of which are herein incorporated by reference. Examples of suitable commercially available titanium-based crosslinking agents are "CL-18™" and "CL-39™," available from Halliburton Energy Services, Inc., Duncan, Okla. Suitable crosslinking agents generally are present in the foamed treatment fluid in an amount sufficient to provide, inter alia, the desired degree of crosslinking between polymer molecules. In certain embodiments of the present invention, the crosslinking agents may be present in an amount in the range from about 0.001% to about 1.0% by weight of the gelling agent. Individuals skilled in the art, with the benefit of this disclosure, will recognize the type and amount of crosslinking agent to use, depending on factors such as the specific gelling agent, desired viscosity, and formation conditions.

The foamed treatment fluids comprising a gelling agent optionally may comprise a gel breaker, to reduce the viscosity of the foamed treatment fluid. Any gel breaker that is able to reduce the viscosity of the treatment fluids when desired is suitable for use in the compositions and methods of the present invention. In certain embodiments, delayed gel breakers and encapsulated gel breakers that will react with the treatment fluids after desired delay periods may be used. Suitable delayed gel breakers may be materials that are slowly soluble in a treatment fluid. Examples of suitable delayed gel breakers include, but are not limited to, enzyme breakers, such as alpha and beta amylases, amyloglucosidase, invertase, maltase, cellulase, and hemicellulase; and oxidizing agents, such as sodium chlorite, sodium bromate, sodium persulfate, ammonium persulfate, magnesium peroxide, lactose, and triethanol amine activator for persulfates. An example of a suitable delayed gel breaker is commercially available under the trade name "VICON NF™," available from Halliburton Energy Services, Inc., Duncan, Okla. Examples of suitable encapsulated gel breakers are described in U.S. Pat. Nos. 5,373,901; 5,604,186; and 6,357,527, the relevant disclosures of which are incorporated herein by reference. The appropriate gel breaker and amount thereof may depend upon the formation characteristics and conditions, the gelling agent chosen, the pH of the treatment fluid, and other factors known to individuals skilled in the art, with the benefit of this disclosure. In some embodiments wherein the gel breaker comprises an enzyme breaker, the enzyme breaker may be included in a treatment fluid of the present invention in an amount in the range of from about 0.1% to about 5% by weight of the gelling agent therein. In some embodiments wherein the gel breaker comprises an oxidizing agent, the oxidizing agent may be included in a treatment fluid of the present invention in an amount in the range of from about 0.1% to about 10% by weight of the gelling agent therein.

The foamed treatment fluid optionally may comprise particulates suitable for use in subterranean applications. Particulates (such as proppant particulates or gravel particulates) suitable for use in subterranean operations include, but are not limited to, sand, bauxite materials, ceramic materials, glass materials, metallic materials, nut hulls, seed shells, polymeric materials, resinous materials, composite materials (such as resinous materials comprising nut hulls, or polymeric materials comprising hollow glass beads), combinations thereof, and the like. The particulate size generally may range from about 2 mesh to about 400 mesh on the U.S. Sieve Series; however, it is to be understood that in certain circumstances, other sizes may be desired and will be entirely suitable for practice of the present invention. In some embodiments of the present invention, the particulate is graded sand having a particle size in the range of from about 10 mesh to about 120 mesh, U.S. Sieve Series. In some embodiments, the particulates may be present in a foamed treatment fluid of the present invention in an amount in the range of from about 0.5 pounds to about 10 pounds per gallon of the foamed treatment fluid exclusive of the volume of the gas. It is within the ability of one skilled in the art, with the benefit of this disclosure, to select a suitable particulate composition and size.

In certain embodiments, the particulates included in the treatment fluids may be coated with an adhesive substance. Generally, the particulates may be coated with an adhesive substance so that the particulates once placed in the desired location may harden into a consolidated mass. Adhesive substances suitable for use in the present invention include, but are not limited to, non-aqueous tackifying agents, aqueous tackifying agents, silyl-modified polyamides, curable resin compositions, derivatives thereof, and combinations thereof.

In some embodiments, the particulates included in the foamed treatment fluid may be coated with a tackifying agent, e.g., to consolidate the particulates downhole. If used, the tackifying agent should not undesirably interact with the particulates or any other components of the foamed treatment fluids of the present invention. As previously discussed, it is believed that the foaming additives of the present invention, inter alia, may not undesirably interact with the tackifying agent coated on particulates that the foamed treatment fluids of the present invention may contain. Tackifying agents suitable for use in the present invention comprise any compound that, when in liquid form or in a solvent solution, will form a nonhardening coating upon a particulate. A particularly preferred group of tackifying agents comprise polyamides that are liquids or in solution at the temperature of the subterranean formation such that they are, by themselves, nonhardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac, and the like. Other suitable tackifying agents are described in U.S. Pat. Nos. 5,853,048 and 5,833,000, the relevant disclosures of which are herein incorporated by reference.

Tackifying agents suitable for use in the present invention may be either used such that they form nonhardening coating or they may be combined with a multifunctional material capable of reacting with the tackifying compound to form a hardened coating. A "hardened coating," as used herein, means that the reaction of the tackifying compound with the multifunctional material will result in a substantially nonflowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde-releasing compounds, diacid halides, dihalides such as dichlorides and dibromides, polyacid anhydrides such as citric acid, epoxides, furfuraldehyde, and glutaraldehyde or aldehyde condensates and the like, and combinations thereof. In some embodiments of the present invention, the multifunctional material may be mixed with the tackifying compound in an amount of from about 0.01% to about 50% by weight of the tackifying compound to effect formation of the reaction product. In some preferable embodiments, the compound is present in an amount of from about 0.5% to about 1% by weight of the tackifying compound. Suitable multifunctional materials are described in U.S. Pat. No. 5,839,510, the relevant disclosure of which is herein incorporated by reference. Other suitable tackifying agents are described in U.S. Pat. No. 5,853,048.

Solvents suitable for use with the tackifying agents of the present invention include any solvent that is compatible with the tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Suitable aqueous tackifier agents are capable of forming at least a partial coating upon the surface of the first particulates. Generally, suitable aqueous tackifier agents are not significantly tacky when placed onto a particulate, but are capable of being "activated" (that is destabilized, coalesced, and/or reacted) to transform the compound into a sticky, tackifying compound at a desirable time. Such activation may occur before, during, or after the aqueous tackifier compound is placed in the subterranean formation. In some embodiments, a pretreatment may be first contacted with the surface of a particulate to prepare it to be coated with an aqueous tackifier compound. Suitable aqueous tackifying agents are generally charged polymers that comprise compounds that, when in an aqueous solvent or solution, will form a nonhardening coating (by itself or with an activator) and, when placed on a particulate, will increase the continuous critical resuspension velocity of the particulate when contacted by a stream of water. The term "continuous critical resuspension velocity" is described in U.S. Pat. No. 6,209,643, the relevant disclosure of which is hereby incorporated by reference.

Examples of aqueous tackifier agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, and combinations thereof. Methods of determining suitable aqueous tackifier agents and additional disclosure on aqueous tackifier agents can be found in U.S. patent application Ser. No. 10/864,061, filed Jun. 9, 2004, and U.S. patent application Ser. No. 10/864,618, filed Jun. 9, 2004, the relevant disclosures of which are hereby incorporated by reference.

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the relevant disclosure of which is herein incorporated by reference.

Curable resin compositions suitable for use in the consolidation fluids of the present invention generally comprise any suitable resin that is capable of forming a hardened, consolidated mass. Many such resins are commonly used in subterranean consolidation operations, and suitable resins include two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Further, the curable resin composition further may contain a solvent. Any solvent that is compatible with the resin and achieves the desired viscosity effect is suitable for use in the present invention. Preferred solvents include those listed above in connection with tackifying compounds. It is within the ability of one skilled in the art, with the benefit of this disclosure, to determine whether and how much solvent is needed to achieve a suitable viscosity.

The foamed treatment fluids of the present invention optionally may comprise a pH buffer to maintain pH in a desired range, among other things, to enhance the stability of the foamed treatment fluid. Examples of suitable pH buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium borate, sodium or ammonium diacetate, sulfamic acid, and the like. The pH buffer may be present in the foamed treatment fluid of the present invention in an amount sufficient to maintain the pH of the treatment fluid at a desired level. One of ordinary skill in the art, with the benefit of this disclosure, will recognize the appropriate pH buffer and amount of pH buffer to use for a chosen application.

As will be recognized by those of ordinary skill in the art, the foamed treatment fluids of the present invention may include a wide variety of other additives suitable for use in subterranean operations, including, but not limited to, defoamers, clay stabilizers, scale inhibitors, fluid loss control additives, and combinations thereof. An example of a suitable clay stabilizer is "Clayfix™ II" clay control material, commercially available from Halliburton Energy Services, Inc., Duncan, Okla. An example of a suitable defoamer is "D-AIR™ 3000L," commercially available from Halliburton Energy Services, Inc., Duncan, Okla.

In one embodiment, the present invention provides a method of treating a subterranean formation, the method comprising: providing a foamed treatment fluid comprising water, a gas, and a foaming additive, the foaming additive comprising at least one amidopropyl betaine having the formula:

wherein R is a capryloyl, a capryl, an octyl, a decyl, a cococyl radical or a mixture thereof, and introducing the foamed treatment fluid into a well bore that penetrates the subterranean formation.

In another embodiment, the present invention provides a method of fracturing a portion of a subterranean formation, the method comprising: providing a foamed treatment fluid comprising water, a gas, and a foaming additive, the foaming additive comprising at least one amidopropyl betaine having the formula:

wherein R is a capryloyl, a capryl, an octyl, a decyl, a cococyl radical, or a mixture thereof, and introducing the foamed treatment fluid into a well bore that penetrates the subterranean formation at or above a pressure sufficient to create or enhance one or more fractures in a portion of the subterranean formation.

In another embodiment, the present invention provides a method of providing some degree of sand control in a subterranean formation, the method comprising: providing a foamed treatment fluid comprising water, a gas, particulates, and a foaming additive, the foaming additive comprising at least one amidopropyl betaine having the formula:

wherein R is a capryloyl, a capryl, an octyl, a decyl, a cococyl radical, or a mixture thereof, and introducing the foamed treatment fluid into a well bore that penetrates the subterranean formation such that the particulates form a gravel pack in or adjacent to the portion of the subterranean formation.

In another embodiment, the present invention provides a method of foaming a treatment fluid that comprises the step of adding to the treatment fluid a gas and a foaming additive, the foaming additive comprising at least one amidopropyl betaine having the formula:

wherein R is a capryloyl, a capryl, an octyl, a decyl, a cococyl radical, or a mixture thereof.

In another embodiment, the present invention provides a method of producing hydrocarbons from a subterranean formation, the method comprising: providing a foamed treatment fluid comprising water, a gas, and a foaming additive, the foaming additive comprising at least one amidopropyl betaine having the formula:

wherein R is a capryloyl, a capryl, an octyl, a decyl, a cococyl radical or a mixture thereof, introducing the foamed treatment fluid into a well bore that penetrates the subterranean formation, and producing hydrocarbons from the subterranean formation.

To facilitate a better understanding of the present invention, the following example of a specific embodiment is given. In no way should the following example be read to limit, or define, the entire scope of the invention.

EXAMPLE

A test sample of the foamed treatment fluid claimed herein was prepared, among other things, to observe the effect of temperature on the stability of the foam and sand settling in a foamed treatment fluid comprising a foaming additive of the present invention. A sample fluid was prepared in fresh water, comprising: 2.0 grams of Clayfix™ II per thousand gallons of the fresh water; 0.1 grams of BA-20™ buffer (a buffer commercially available from Halliburton Energy Services, Inc., Duncan, Okla.) per thousand gallons of the fresh water; 10 pounds of WG-11™ gelling agent (a gelling agent commercially available from Halliburton Energy Services, Inc., Duncan, Okla.); and 15 grams of a capryloyl/caprylamidopropylbetaine per thousand gallons of the fresh water. After preparation, a volume of 82 cc of the sample fluid was loaded in a high-pressure cell before adding 100 grams of 20/40-mesh sand, obtaining a sand concentration of 6 ppg. The cell was then pressurized with nitrogen, to yield a foamed sample fluid containing nitrogen 70% by volume. Next, the cell was heated while stirring the foamed sample fluid, pausing momentarily to observe the condition of the foam formed therein. Table 1 below shows the results of the above test.

TABLE 1

| Time (min) | Heater Electric Power (%) | Cell Temp (° F.) | Fluid Temp (° F.) | Pressure (psig) | Observations |
|---|---|---|---|---|---|
| 0 | 0 | 74 | 74 | 800 | good foam; at static condition the sand drops in 5 sec |
| 11 | 50 | 125 | 100 | 900 | good foam; at static condition the sand drops in 5 sec |
| 16 | 50 | 150 | 125 | 900 | good foam; at static condition the sand drops in 5 sec |
| 25 | 50 | 180 | 150 | 900 | good foam; at static condition the sand drops in 5 sec |
| 33 | 65 | 225 | 170 | 1000 | good foam; at static condition the sand drops in <5 sec |
| 36 | 65 | 225 | 175 | 1000 | good foam; at static condition the sand drops in <5 sec |
| 42 | 75 | 260 | 200 | 1000 | good foam appearance |
| 46 | 75 | 290 | 226 | 1000 | good foam appearance; at static condition the sand drops instantly |
| 51 | 75 | 310 | 250 | 1000 | foam starting to collapse when static; returns to weak foam |
| 52 | 75 | 320 | 273 | 1000 | froth |
| 52 | 75 | 320 | 286 | 1000 | broke to water |

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of treating a subterranean formation, the method comprising:
   providing a foamed treatment fluid comprising water, a gas, a gelling agent, and a foaming additive, the foaming additive comprising at least one amidopropyl betaine having the formula:

R—CONHCH$_2$CH$_2$CH$_2$N$^+$(CH$_3$)$_2$CH$_2$COO$^−$ wherein R is a capryloyl, a capryl, an octyl, a decyl, a cococyl radical or a mixture thereof; and
   introducing the foamed treatment fluid into a well bore penetrating the subterranean formation.

2. The method of claim 1 wherein the water comprises at least one of the following: fresh water, saltwater, brine, seawater, or a combination thereof.

3. The method of claim 1 wherein the gas comprises at least one of the following: nitrogen, carbon dioxide, air, a derivative thereof, or a combination thereof.

4. The method of claim 1 wherein the gas is present in the foamed treatment fluid in an amount sufficient to form a foam.

5. The method of claim 1 wherein the gas is present in the foamed treatment fluid in an amount in the range of from about 5% to about 95% by volume of the foamed treatment fluid exclusive of the volume of the gas.

6. The method of claim 1 wherein the foaming additive is present in the foamed treatment fluid in an amount in the range of from about 0.01% to about 10% by volume of the water.

7. The method of claim 1 wherein the foamed treatment fluid further comprises a crosslinking agent.

8. The method of claim 1 wherein the foamed treatment fluid further comprises a gel breaker.

9. The method of claim 1 wherein the foamed treatment fluid further comprises a crosslinked gelling agent that is a reaction product of a gelling agent and a crosslinking agent.

10. The method of claim 1 wherein the foamed treatment fluid further comprises at least one of the following: a defoamer, a clay stabilizer, a scale inhibitor, a fluid loss control additive, or a combination thereof.

11. The method of claim 1 wherein the foamed treatment fluid further comprises particulates.

12. The method of claim 11 wherein the foamed treatment fluid is introduced into the well bore, such that the particulates form a gravel pack in or adjacent to a portion of the subterranean formation.

13. The method of claim 11 wherein the particulates comprise at least one of the following: sand, a bauxite material, a ceramic material, a glass material, a metallic material, a nut hull, a seed shell, a polymeric material, a resinous material, a resinous material comprising nut hulls, a polymeric material comprising hollow glass beads, a derivative thereof, or a combination thereof.

14. The method of claim 11 wherein the particulates are coated with an adhesive substance.

15. The method of claim 14 wherein the adhesive substance comprises at least one of the following: a nonaqueous tackifying agent, an aqueous tackifying agent, a silyl-modified polyamide, a curable resin composition, a derivative thereof, or a combination thereof.

16. The method of claim 15 wherein the nonaqueous tackifying agent comprises at least one of the following: a polyamide, a polyester, a polycarbonate, polycarbamate, a natural resin, a derivative thereof, or a combination thereof.

17. The method of claim 15 wherein the nonaqueous tackifying agent further comprises a multifunctional material.

18. The method of claim 17 wherein the multifunctional material comprises at least one of the following: an aldehyde, a dialdehyde, a hemiacetal, an aldehyde releasing compound, a diacid halide, a dihalide, a polyacid anhydride, an epoxide, furfuraldehyde, glutaraldehyde or aldehyde condensate, a derivative thereof, or a combination thereof.

19. The method of claim 15 wherein the aqueous tackifying agent comprises at least one of the following: an acrylic acid polymer, an acrylic acid ester polymer, an acrylic acid derivative polymer, an acrylic acid homopolymer, an acrylic acid ester homopolymer, an acrylamido-methyl-propane sulfonate polymer, an acrylamido-methylpropane sulfonate derivative polymer, an acrylamido-methyl-propane sulfonate copolymer, an acrylic acid/acrylamido-methyl-propane sulfonate copolymer, a derivative thereof, or a mixture thereof.

20. The method of claim 15 wherein the aqueous tackifying agent is made tacky through exposure to an activator and wherein the activator comprises at least one of the following: an organic acid, an anhydride of an organic acid, an inorganic acid, an inorganic salt, a charged surfactant, a charged polymer, a derivative thereof, or a combination thereof.

21. The method of claim 15 wherein the curable resin composition comprises at least one of the following: a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, copolymer polyester resin, a polyurethane resin, a hybrid polyurethane resin, a copolymer polyurethane resin, an acrylate resin, a derivative thereof, or a combination thereof.

22. The method of claim 11 wherein the particulates are present in the foamed treatment fluid in an amount in the range of from about 0.5 pounds to about 10 pounds per gallon of the foamed treatment fluid exclusive of the volume of the gas.

23. The method of claim 1 wherein the foamed treatment fluid further comprises a pH buffer.

24. The method of claim 1 wherein the foamed treatment fluid is introduced into the well bore at or above a pressure sufficient to create or enhance one or more fractures in a portion of the subterranean formation.

25. The method of claim 1 wherein the foaming additive comprises a mixture of caprylamidopropyl betaine and octylamidopropyl betaine.

26. A method of fracturing a portion of a subterranean formation, the method comprising:
providing a foamed treatment fluid comprising water, a gas, and a foaming additive, the foaming additive comprising at least one amidopropyl betaine having the formula:

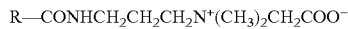

R—CONHCH$_2$CH$_2$CH$_2$N$^+$(CH$_3$)$_2$CH$_2$COO$^-$ wherein R is a capryloyl, a capryl, an octyl, a decyl, a cococyl radical, or a mixture thereof; and
introducing the foamed treatment fluid into a well bore that penetrates the subterranean formation at or above a pressure sufficient to create or enhance one or more fractures in a portion of the subterranean formation.

27. The method of claim 26 wherein the gas comprises at least one of the following: nitrogen, carbon dioxide, air, a derivative thereof, or a combination thereof.

28. The method of claim 26 wherein the gas is present in the foamed treatment fluid in an amount sufficient to form a foam.

29. The method of claim 26 wherein the gas is present in the foamed treatment fluid in an amount in the range of from about 5% to about 95% by volume of the foamed treatment fluid exclusive of the volume of the gas.

30. The method of claim 26 wherein the foaming additive is present in the foamed treatment fluid in an amount in the range of from about 0.0 1% to about 10% by volume of the water.

31. The method of claim 26 wherein the foamed treatment fluid further comprises a gelling agent.

32. The method of claim 31 wherein the foamed treatment fluid further comprises a crosslinking agent.

33. The method of claim 31 wherein the foamed treatment fluid further comprises a gel breaker.

34. The method of claim 26 wherein the foamed treatment fluid further comprises a crosslinked gelling agent that is a reaction product of a gelling agent and a crosslinking agent.

35. The method of claim 26 wherein the foamed treatment fluid further comprises particulates.

36. The method of claim 35 wherein the particulates comprise at least one or more of the following: sand, a bauxite material, a ceramic material, a glass material, a metallic material, a nut hull, a seed shell, a polymeric material, a resinous material, a resinous material comprising nut hulls, a polymeric material comprising hollow glass beads, a derivative thereof, or a combination thereof.

37. The method of claim 35 wherein the particulates are coated with an adhesive substance.

38. The method of claim 37 wherein the adhesive substance comprises at least one of the following: a nonaqueous tackifying agent, an aqueous tackifying agent, a silyl-modified polyamide, a curable resin composition, a derivative thereof, or a combination thereof.

39. The method of claim 26 wherein the foamed treatment fluid further comprises a pH buffer.

40. The method of claim 26 wherein the foaming additive comprises a mixture of caprylamidopropyl betaine and octylamidopropyl betaine.

41. A method of providing some degree of sand control in a portion of a subterranean formation, the method comprising:
providing a foamed treatment fluid comprising water, a gas, particulates, and a foaming additive, the foaming additive comprising at least one amidopropyl betaine having the formula:

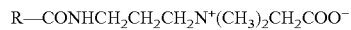

R—CONHCH$_2$CH$_2$CH$_2$N$^+$(CH$_3$)$_2$CH$_2$COO$^-$ wherein R is a capryloyl, a capryl, an octyl, a decyl, a cococyl radical, or a mixture thereof; and
introducing the foamed treatment fluid into a well bore that penetrates the subterranean formation such that the particulates form a gravel pack in or adjacent to a portion of the subterranean formation.

42. The method of claim 41 wherein the foaming additive comprises a mixture of caprylamidopropyl betaine and octylamidopropyl betaine.

43. The method of claim 41 wherein the gas comprises at least one of the following: nitrogen, carbon dioxide, air, a derivative thereof, or a combination thereof.

44. The method of claim 41 wherein the foamed treatment fluid further comprises a gelling agent.

45. The method of claim 44 wherein the foamed treatment fluid further comprises a crosslinking agent.

46. The method of claim 44 wherein the foamed treatment fluid further comprises a gel breaker.

47. A method of foaming a fracturing fluid comprising the step of adding to the fracturing fluid a gas and a foaming additive, the foaming additive comprising at least one amidopropyl betaine having the formula:

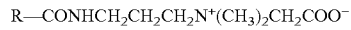

R—CONHCH$_2$CH$_2$CH$_2$N$^+$(CH$_3$)$_2$CH$_2$COO$^-$ wherein R is a capryloyl, a capryl, an octyl, a decyl, a cococyl radical, or a mixture thereof.

48. The method of claim 47 wherein the foaming additive comprises a mixture of caprylamidopropyl betaine and octylamidopropyl betaine.

49. The method of claim 47 wherein the gas comprises at least one of the following: nitrogen, carbon dioxide, air, a derivative thereof, or a combination thereof.

50. The method of claim 47 wherein the fracturing fluid further comprises a gelling agent.

51. The method of claim 50 wherein the fracturing fluid further comprises a crosslinking agent.

52. The method of claim 50 wherein the fracturing fluid further comprises a gel breaker.

53. The method of claim 47 further wherein the fracturing fluid further comprises particulates.

54. A method of producing hydrocarbons from a subterranean formation, the method comprising:
providing a foamed treatment fluid comprising water, a gas, and a foaming additive, the foaming additive comprising at least one amidopropyl betaine having the formula:

R—CONHCH$_2$CH$_2$CH$_2$N$^+$(CH$_3$)$_2$CH$_2$COO$^-$ wherein R is a capryloyl, a capryl, an octyl, a decyl, a cococyl radical or a mixture thereof
introducing the foamed treatment fluid into a well bore penetrating the subterranean formation; and
producing hydrocarbons from the subterranean formation.

55. The method of claim 54 wherein the foaming additive comprises a mixture of caprylamidopropyl betaine and octylamidopropyl betaine.

56. The method of claim 54 wherein the gas comprises at least one of the following: nitrogen, carbon dioxide, air, a derivative thereof, or a combination thereof.

57. The method of claim 54 wherein the foamed treatment fluid further comprises a gelling agent.

58. The method of claim 57 wherein the foamed treatment fluid further comprises a crosslinking agent.

59. The method of claim 57 wherein the foamed treatment fluid further comprises a gel breaker.

60. A foamed treatment fluid comprising water, a gas, a gelling agent, and a foaming additive, the foaming additive comprising at least one amidopropyl betaine having the formula:

R—CONHCH$_2$CH$_2$CH$_2$N$^+$(CH$_3$)$_2$CH$_2$COO$^-$ wherein R is a capryloyl, a capryl, an octyl, a decyl, a cococyl radical, or a mixture thereof.

61. The foamed treatment fluid of claim 60 wherein the water comprises at least one of the following: fresh water, saltwater, brine, seawater, or a combination thereof.

62. The foamed treatment fluid of claim 60 wherein the gas comprises at least one of the following: nitrogen, carbon dioxide, air, a derivative thereof, or a combination thereof.

63. The foamed treatment fluid of claim 60 wherein the gas is present in the foamed treatment fluid in an amount sufficient to form a foam.

64. The foamed treatment fluid of claim 60 wherein the gas is present in the foamed treatment fluid in an amount in the range of from about 5% to about 95% by volume of the foamed treatment fluid exclusive of the volume of the gas.

65. The foamed treatment fluid of claim 60 wherein the foaming additive is present in the foamed treatment fluid in an amount in the range of from about 0.01% to about 10% by volume of the water.

66. The foamed treatment fluid of claim 60 wherein the foamed treatment fluid further comprises a crosslinking agent.

67. The foamed treatment fluid of claim 60 wherein the foamed treatment fluid further comprises a gel breaker.

68. The foamed treatment fluid of claim 60 wherein the foamed treatment fluid further comprises a crosslinked gelling agent that is a reaction product of a gelling agent and a crosslinking agent.

69. The foamed treatment fluid of claim 60 wherein the foamed treatment fluid further comprises at least one of the following: a defoamer, a clay stabilizer, a scale inhibitor, a fluid loss control additive, or a combination thereof.

70. The foamed treatment fluid of claim 60 wherein the foamed treatment fluid further comprises particulates.

71. The foamed treatment fluid of claim 70 wherein the particulates comprises at least one of the following: sand, a bauxite material, a ceramic material, a glass material, a metallic material, a nut hull, a seed shell, a polymeric material, a resinous material, a resinous material comprising nut hulls, a polymeric material comprising hollow glass beads, or a combination thereof.

72. The foamed treatment fluid of claim 70 wherein the particulates are coated with an adhesive substance.

73. The foamed treatment fluid of claim 72 wherein the adhesive substance comprises at least one of the following: a nonaqueous tackifying agent, an aqueous tackifying agent, a silyl-modified polyamide, a curable resin composition, or a combination thereof.

74. The foamed treatment fluid of claim 73 wherein the nonaqueous tackifying agent comprises at least one of the following: a polyamide, a polyester, a polycarbonate, a polycarbamate, a natural resin, or a combination thereof.

75. The foamed treatment fluid of claim 73 wherein the nonaqueous tackifying agent further comprises a multifunctional material.

76. The foamed treatment fluid of claim 73 wherein the aqueous tackifying agent comprises at least one of the following: an acrylic acid polymer, an acrylic acid ester polymer, an acrylic acid derivative polymer, an acrylic acid homopolymer, an acrylic acid ester homopolymer, an acrylamido-methyl-propane sulfonate polymer, an acrylamido-methyl-propane sulfonate derivative polymer, an acrylamido-methyl-propane sulfonate copolymer, an acrylic acid/acrylamido-methyl-propane sulfonate copolymer, or a mixture thereof.

77. The foamed treatment fluid of claim 73 wherein the aqueous tackifying agent is made tacky through exposure to an activator and wherein the activator comprises an organic acid, an anhydride of an organic acid, an inorganic acid, an inorganic salt, a charged surfactant, a charged polymer, or a combination thereof.

78. The foamed treatment fluid of claim 73 wherein the curable resin composition comprises at least one of the following: a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, copolymer polyester resin, a polyurethane resin, a hybrid polyurethane resin, a copolymer polyurethane resin, an acrylate resin, or a combination thereof.

79. The foamed treatment fluid of claim 70 wherein the particulates are present in the foamed treatment fluid in an amount in the range of from about 0.5 pounds to about 10 pounds per gallon of the treatment fluid exclusive of the volume of the gas.

80. The foamed treatment fluid of claim 60 wherein the foamed treatment fluid further comprises a pH buffer.

81. The foamed treatment fluid of claim 60 wherein the foaming additive comprises a mixture of caprylamidopropyl betaine and octylamidopropyl betaine.

82. A foamed fracturing fluid comprising water, a gas, and a foaming additive, the foaming additive comprising at least one amidopropyl betaine having the formula:

wherein R is a capryloyl, a capryl, an octyl, a decyl, a cococyl radical, or a mixture thereof.

83. The foamed fracturing fluid of claim 82 wherein the foaming additive comprises a mixture of caprylamidopropyl betaine and octylamidopropyl betaine.

84. The foamed fracturing fluid of claim 82 wherein the gas comprises at least one of the following: nitrogen, carbon dioxide, air, a derivative thereof, or a combination thereof.

85. The foamed fracturing fluid of claim 82 wherein the foamed fracturing fluid further comprises a gelling agent.

86. The foamed fracturing fluid of claim 85 wherein the foamed fracturing fluid further comprises a crosslinking agent.

87. The foamed fracturing fluid of claim 85 wherein the foamed fracturing fluid further comprises a gel breaker.

88. The foamed fracturing fluid of claim 82 further wherein the fracturing fluid further comprises particulates.

* * * * *